United States Patent [19]
Birger

[11] Patent Number: 5,103,418
[45] Date of Patent: Apr. 7, 1992

[54] DANGEROUS RANGE DETECTOR FOR FLOATING POINT ADDER

[75] Inventor: Ari I. Birger, Haifa, Israel
[73] Assignee: Motorola, Inc., Schaumburg, Ill.
[21] Appl. No.: 438,376
[22] Filed: Nov. 20, 1989
[51] Int. Cl.$^5$ .............................................. G06F 7/38
[52] U.S. Cl. .................................. 364/748; 364/715.04
[58] Field of Search ................ 364/715.04, 736.5, 748

[56] References Cited
U.S. PATENT DOCUMENTS 4,562,553 12/1985 Mattedi et al. ..................... 364/748
4,644,490 2/1987 Kobayashi et al. ................. 364/748
4,785,421 11/1988 Takahashi et al. ............. 364/715.04

Primary Examiner—Dale M. Shaw
Attorney, Agent, or Firm—Robert L. King

[57] ABSTRACT

A floating point adder operates in a subtraction mode. In order to avoid excess shifting resulting in a negative exponent, as might happen in the case of a substraction operation which results in an unnormalized number where the exponent of the subtraction result is low, the following steps are provided. A number is created having leading zeros no greater in number than the value of the exponent part; this number is logically combined with the mantissa part in a bit-wise OR operation, to provide a combined number; the position of a leading bit state of the combined number is detected, and the mantissa part of the original number is shifted a number of bit positions dependent on the detected position.

6 Claims, 2 Drawing Sheets

| THE GREATER EXPONENT | THE TRANSLATED WORD |
|---|---|
| 0 | 10000000000000000000000000000000 |
| 1 | 01000000000000000000000000000000 |
| 2 | 00100000000000000000000000000000 |
| 3 | 00010000000000000000000000000000 |
| 4 | 00001000000000000000000000000000 |
| 5 | 00000100000000000000000000000000 |
| 6 | 00000010000000000000000000000000 |
| 7 | 00000001000000000000000000000000 |
| 8 | 00000000100000000000000000000000 |
| 9 | 00000000010000000000000000000000 |
| 10 | 00000000001000000000000000000000 |
| 11 | 00000000000100000000000000000000 |
| 12 | 00000000000010000000000000000000 |
| 13 | 00000000000001000000000000000000 |
| 14 | 00000000000000100000000000000000 |
| 15 | 00000000000000010000000000000000 |
| 16 | 00000000000000001000000000000000 |
| 17 | 00000000000000000100000000000000 |
| 18 | 00000000000000000010000000000000 |
| 19 | 00000000000000000001000000000000 |
| 20 | 00000000000000000000100000000000 |
| 21 | 00000000000000000000010000000000 |
| 22 | 00000000000000000000001000000000 |
| 23 | 00000000000000000000000100000000 |
| 24 | 00000000000000000000000010000000 |
| 25 | 00000000000000000000000001000000 |
| 26 | 00000000000000000000000000100000 |
| 27 | 00000000000000000000000000010000 |
| 28 | 00000000000000000000000000001000 |
| 29 | 00000000000000000000000000000100 |
| 30 | 00000000000000000000000000000010 |
| 31 | 00000000000000000000000000000001 |
| 32 OR GREATER | 00000000000000000000000000000000 |

*FIG. 2*

DANGEROUS RANGE DETECTOR FOR FLOATING POINT ADDER

FIELD OF THE INVENTION

This invention relates generally to arithmetic circuits, and more particularly, to floating point adders.

BACKGROUND OF THE INVENTION

It is normal in the art of floating point arithmetic and logic units to normalize operands to a standard, such as IEEE standard P754. By adopting a standard, the range of numbers upon which computations can be made is limited beyond the physical limitations of the processor performing the computations. Thus, the minimum order of magnitude of a number will be limited by the exponent (exp.=0), whereas in fact a lower order of magnitude number could be handled by having a denormalized mantissa (i.e. one having one or more leading zeros).

A problem with handling denormalized numbers is that, depending on the computations, a normalization step is generally required at the end of the computation. In the case of subtraction computations, even in the case where the two operands are normalized, the result is frequently denormalized. For example, if the number 1.00101 is subtracted from 1.00110, the result is 0.00001. This result requires normalization. If normalization of a number having a low exponent is carried out automatically, there may be 'excess' normalization in the sense that a negative exponent results and a further denormalization step is still required to provide the desired result.

SUMMARY OF THE INVENTION

It is an object of the present invention to provide an improved floating point computation device which minimizes the time required for a substration computation.

According to the present invention, a method of computation of a floating point binary number having an exponent part and a mantissa part is provided, comprising the steps of:

creating a number having leading zeros no greater in number than the value of the exponent part;

logically combining in a bit-wise logic operation the number created with the mantissa part, to provide a combined number;

detecting the position of a leading bit state of the combined number and shifting the mantissa part of the original number a number of bit positions dependent on the detected position.

In this manner, the combined number is used to perform the final shifting step and the combined number ensures that there is no overshoot in the shifting operation. The leading bit state detected will generally be a '1'. It is preferred that the binary number is provided by a subtracting operation.

The exponent part is preferably compared with the total number of bits of the mantissa part, and if it is greater, the created number is zero. Thus, if the exponent is greater than 32 (in the case of a 32-bit mantissa), the created number is zero, with the result that the OR operation has no effect, and the result of the subtraction operation is shifted in a manner in accordance with prior art methods of normalization. In all other cases, the number of leading zeros in the created number will be equal to the value of the exponent part.

BRIEF DESCRIPTION OF THE DRAWINGS

FIG. 2 shows the translation table of FIG. 1.

DETAILED DESCRIPTION OF THE PREFERRED EMBODIMENT

Figure 1:
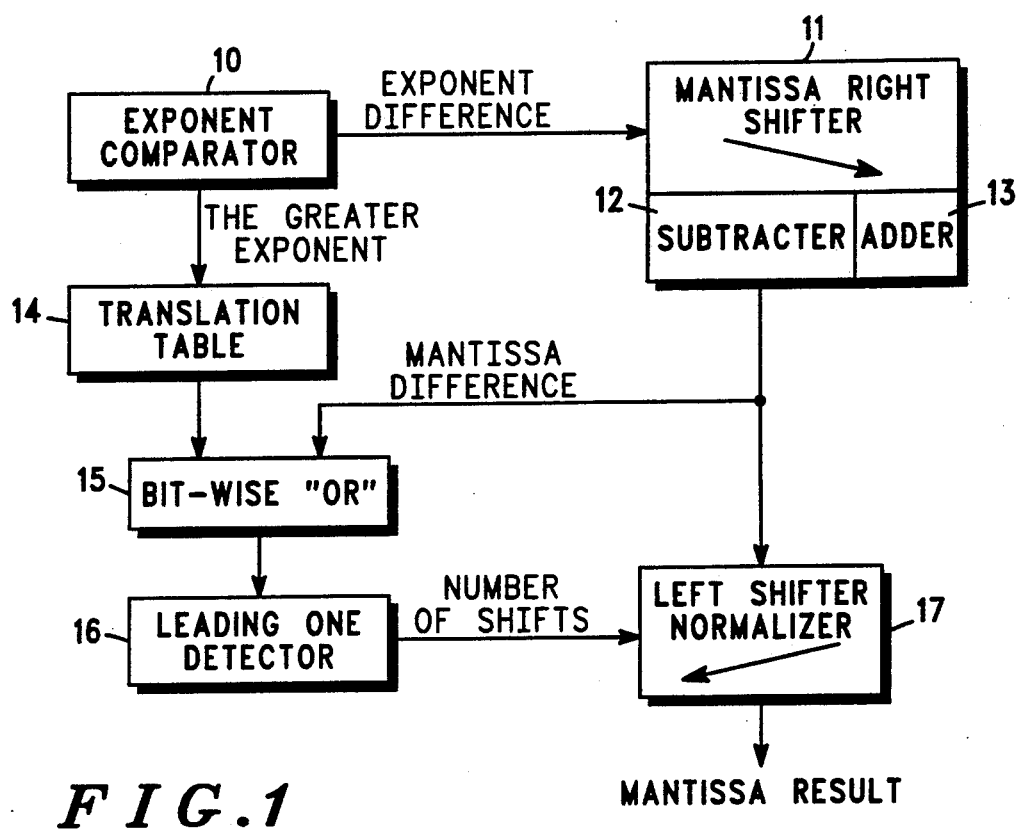
FIG. 1 shows a floating point adder and dangerous range detector in accordance with the present invention.

Referring to FIG. 1, there is shown a floating point addition unit comprising an exponent comparator part 10, a mantissa right shifter 11, a subtractor 12 and an adder 13. Two floating point operands are loaded into the addition unit, and before an addition or subtraction step can be carried out, the exponents are compared in the exponent comparator part 10. In accordance with this comparison, one or the other of the operands is shifted. Further details of this operation can be found in my co-pending U.S. patent application Ser. No. 07/434,208 entitled "Floating Point Adder with Pre-Shifter", assigned to the assignee hereof, which is hereby incorporated by reference.

The present invention is primarily directed towards the subtractor 12. Where two numbers are subtracted, the result may be denormalized, such that the mantissa needs to be shifted to the left, and the exponent reduced. For example, if the number 1.00101 is subtracted from 1.00110, the result is 0.00001. This result requires shifting five places to the left and the exponent needs to be reduced by five. Clearly, the maximum number of shifts for a 32-bit machine is 32 bits. Thus, if the exponent is greater than 32, the exponent of the result will always remain positive, even if one of the operands is denormalized. If one of the operands is unnormalized and has an exponent equal to or less than 32, there is the possibility that the resultant number could have a negative exponent. This is undesirable, and would require denormalization to provide a zero exponent and a denormalized mantissa. This is an unnecessarily large number of steps in the calculation.

In the operation of the preferred embodiment of the present invention, the exponent derived from the exponent comparator part 10 is considered prior to any shifting step. This exponent is always equal to the greater of the exponents of the operands. If this exponent is greater than 32, there should be no problems in the final shifting operation. The manner in which such a number is handled is described below.

If the exponent is less than or equal to 32, it is decoded by using a translation table 14 and a decoded number is created having as many leading zeros as the exponent value. The translation table 14 is shown in FIG. 2. Thus, if exp=1, the number created is 01xxxx (where each x represents a 'don't care' state). This number is combined with the mantissa part in a bit-wise OR operation in logic circuitry 15 having a plurality of bit-wise OR gates.

There follows two examples of the above steps.

EXAMPLE A

Exp=4  Mantissa=0.01xxxx number created by translation table 14=0.0001xx
combined number=0.01x1xx

EXAMPLE B

Exp=4  Mantissa=0.00001x number created by translation table 14=0.0001xx
combined number=0.00011x In the case of example A, the leading 1 of the combined number results from the mantissa. In the case of example B, the leading 1 of the combined number results from the translation table 14. The leading 1 is detected in a leading one detector 16 and this controls a shifter 17, which takes the mantissa from the subtractor 12 and shifts it to the left a number of positions in accordance with the position of the leading 1 in detector 16. Thus, in example A, the resultant mantissa is shifted two places and the exponent is decreased by two. In example B, the mantissa is shifted four places and the exponent is decreased by four (to zero). The invention has the advantage that the final shift operation of shifter 17 never results in a negative exponent.

Figure 3:
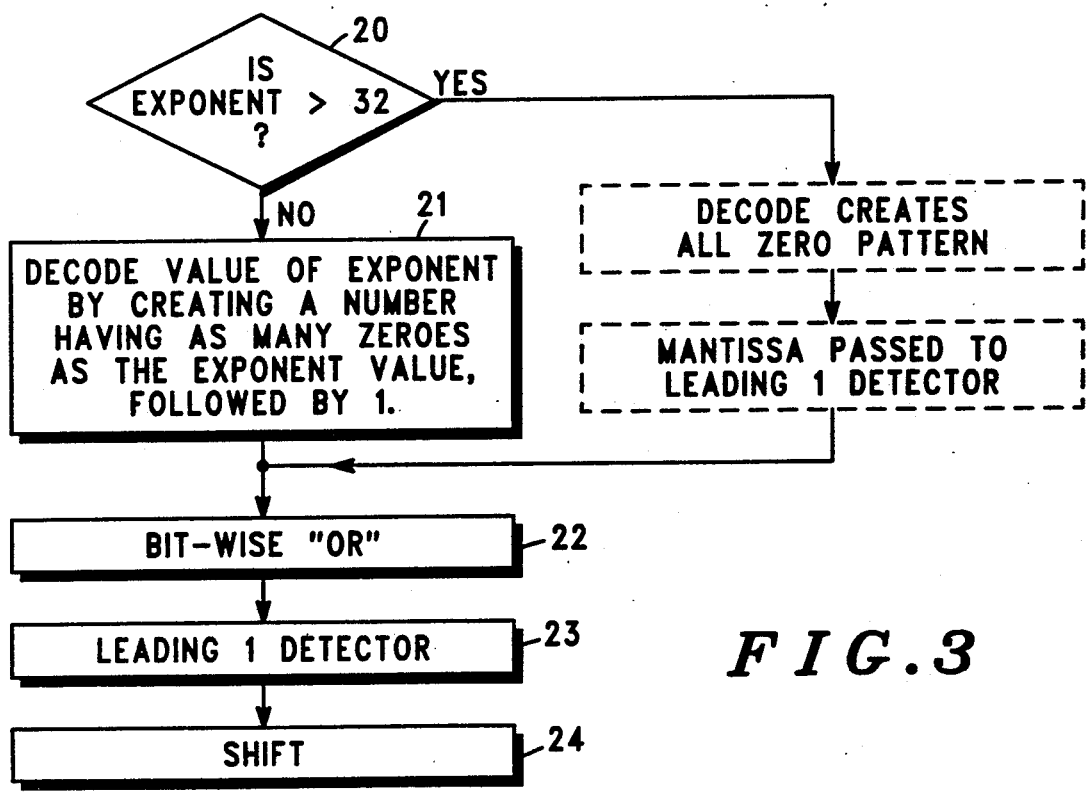
FIG. 3 shows a flow diagram of the operation of the adder and detector of FIG. 1.

Referring to FIG. 3, the above steps are described in a flowchart. Step 20 is the initial step of determining whether the exponent exceeds 32. If the exponent is less than or equal to 32, the steps 21, 22, 23 and 24 are carried out, as described above. If the exponent is greater than 32, there is no need to use the other steps of the invention, but the shifter 17 can rely soley on the mantissa from subtracter 12. The leading one detector 16 in any case controls the degree of shifting in the shifter 17 and the detector 16 derives its input from the logic circuitry 15. To handle such a situation, the translation table 14 simply passes a zero pattern (0.0000...) to the logic circuitry 15. The result of the OR operation is then that the mantissa from subtractor 12 is passed directly to the leading one detector 16. In this manner, excess normalization is avoided, thus speeding up the calculation.

It will, of course, be understood that the above example has been given by way of example only, and that modifications of detail can be made within the scope of the invention.

I claim:

1. In a floating point adder circuit, a method of controlling bit shifts within a predetermined permissible range of shift values required to normalize a difference of first and second floating point binary numbers, each floating point binary number having an exponent and a mantissa, comprising the steps of:

coupling the first and second floating point binary numbers to a comparator which both determines which floating point binary number has a largest valued exponent and provides a difference between exponents of the first and second floating point binary numbers;

coupling a decoder to the comparator, the decoder receiving the largest valued exponent and providing an intermediate number having leading zeros no greater in number than a value of the largest valued exponent;

providing a subtractor to calculate a difference between mantissas of the first and second floating point binary numbers, one of the mantissas of the first and second floating point binary numbers being shifted an amount determined by the difference between exponents and before said difference calculation;

coupling the intermediate number as a first input and the difference between mantissas as a second input to logic circuitry for logically combining in a bitwise logic operation the first and second inputs, to provide a combined number;

coupling the combined number to a detector for detecting a bit position of the combined number of a leading bit having a predetermined logic state, and providing a control signal in response thereto; and coupling the difference between mantissas of the first and second floating point binary numbers to a shifter circuit and shifting the difference between mantissas by a number of bit positions in response to the control signal to provide an output mantissa which is a resultant mantissa of an addition of the first and second floating point binary numbers.

2. The method according to claim 1 wherein the step of coupling a decoder to the comparator further comprises coupling a translation table having a plurality of stored multibit operands, each stored operand corresponding to a predetermined exponent value for being selectively output as the intermediate number.

3. The method according to claim 1 wherein the step of coupling a decoder to the comparator and providing an intermediate number further comprises determining whether the largest valued exponent is greater in value than a total number of bits of the mantissa of the first floating point binary number and providing a zero value as the intermediate number when the largest valued exponent has the greatest value.

4. A floating point adder which controls bit shifts of floating point binary numbers within a predetermined permissible range of shift values, comprising:

a comparator for receiving a first and a second exponent of a first and a second floating point binary number, respectively, the comparator selecting one of the first or second exponents which has a larger value, and providing a difference of the first and second exponents;

mantissa computation means coupled to the comparator, the mantissa computation means receiving a first mantissa of the first floating point binary number, a second mantissa of the second floating point binary number, and shifting one of the first and second mantissas in response to the difference of the first and second exponents, before providing a difference signal of the first and second mantissas;

a decoder coupled to the comparator for receiving the one of the first or second exponents which has the larger value and providing an intermediate number having leading zeros no greater in number than the value of the exponent with larger value;

logic circuitry coupled to the decoder for receiving the intermediate number created by the decoding means and logically combining the received intermediate number in a bit-wise logic operation with the difference signal, to provide a combined number;

a detector coupled to the logic circuitry for receiving the combined number, the detector detecting a position of a leading bit with a predetermined logic state of the combined number; and a shifter coupled to both the detector and the mantissa computation means, for shifting the difference signal a predetermined number of bit positions dependent on the detected position, thereby avoiding excess shifting when the value of the exponent with larger value is less than or equal to a predetermined number of bits, the shifter providing an output mantissa which is a resultant mantissa of an addition of the first and second floating point binary numbers.

5. A floating point adder according to claim 4, wherein the decoder further comprises:
   decode circuitry for determining a value of the received one exponent with larger value and providing a predetermined one of a plurality of stored operands as the intermediate number in response to the determined value.

6. A dangerous range detector in a floating point adder circuit, for controlling bit shifts within a predetermined permissible range of shift values required to normalize a difference of first and second floating point binary numbers, each floating point binary number having an exponent part and a mantissa part, comprising:
   exponent computation means for selecting an exponent part of the floating point binary numbers having a larger value and for providing a difference of the exponent parts of the floating point binary numbers;
   mantissa computation means for shifting one of the mantissa parts of the floating point numbers in response to the difference of the exponent parts before providing a difference signal of the mantissa parts;
   decoding means responsive to the exponent part with larger value provided by the exponent computation means to provide a number having leading zeros no greater in number than the value of the exponent part with larger value;
   logic circuitry for receiving the number created by the decoding means and logically combining the received number in a bit-wise OR operation with the difference signal, to provide a combined number;
   detecting means responsive to the logic circuitry for detecting a position of a leading logic one bit of the combined number; and
   shifting means responsive to the detecting means for shifting the difference signal a predetermined number of bit positions dependent on the detected position, thereby avoiding excess shifting when the value of the exponent part with larger value is less than or equal to a predetermined number of bits.

* * * * *